(12) United States Patent
Stefanovic et al.

(10) Patent No.: US 6,417,650 B1
(45) Date of Patent: Jul. 9, 2002

(54) METHOD OF CONTROLLING AN INDUCTION GENERATOR

(75) Inventors: Victor R. Stefanovic, Afton, VA (US); John Michael Miller, Saline, MI (US)

(73) Assignee: Ford Global Technologies Inc., Dearborn, MI (US)

(*) Notice: Subject to any disclaimer, the term of this patent is extended or adjusted under 35 U.S.C. 154(b) by 57 days.

(21) Appl. No.: 09/734,530

(22) Filed: Dec. 13, 2000

(51) Int. Cl.$^7$ ................................................ H02P 9/00
(52) U.S. Cl. ........................................ 322/47; 322/28
(58) Field of Search .......................... 322/20, 27, 28, 322/36, 47

(56) References Cited

U.S. PATENT DOCUMENTS

| | | | |
|---|---|---|---|
| 4,495,460 A | * 1/1985 | Bernays, Jr. | 324/77.11 |
| 4,678,248 A | 7/1987 | Depenbrock | 318/805 |
| 5,028,804 A | * 7/1991 | Lauw | 290/40 C |
| 5,281,905 A | * 1/1994 | Dhyanchand et al. | 322/32 |
| 5,652,485 A | * 7/1997 | Spiegel et al. | 318/147 |
| 5,751,069 A | * 5/1998 | Rajashekara et al. | 290/40 C |
| 5,798,631 A | * 8/1998 | Spee et al. | 322/25 |
| 5,929,612 A | * 7/1999 | Eisenhaure et al. | 322/47 |
| 5,977,679 A | 11/1999 | Miller et al. | 310/164 |

OTHER PUBLICATIONS

I. Takahashi et al., "A New Quick–Response and High–Efficiency Control Strategy of an Induction Motor", IEEE–IA Transactions, Sep./Oct. 1986, pp. 820–827, vol. IA–22, No. 5.

M. Depenbrock, "Direct Self–Control (DSC) of InverterFed Induction Machine", IEEE Transactions on Power Electronics, Oct. 1988, pp. 420–429, vol. 3, No. 4.

C. Lascu et al., "A Modified Direct Torque Control (DTC) for Induction Motor Sensorless Drive", IEEE–IAS, Jan. 1988, pp. 415–422.

* cited by examiner

*Primary Examiner*—Nicholas Ponomarenko
(74) *Attorney, Agent, or Firm*—Jennifer M. Stec

(57) ABSTRACT

A method of controlling an induction generator such as an automotive starter-alternator or a windmill is disclosed. The method comprises using a plurality of flux sensing coils and controlling at least one of a machine flux and an output voltage based on the stator or rotor flux magnitude and position. One embodiment of the invention only uses flux sensing coils without requiring current sensors or position sensors. This method comprises the steps of measuring a stator flux in the generator using a plurality of flux sensing coils to determine a magnitude and position of the stator flux; measuring a DC voltage of an inverter, the inverter being operatively connected to the generator; comparing the measured stator flux magnitude with a desired flux to determine a flux error amount, the flux error amount being input to a flux regulator; determining a d-axis voltage so as to reduce the flux error amount; comparing a desired voltage with the measured DC voltage to determine a voltage error amount, the voltage error amount being input to a voltage regulator; determining a q-axis voltage so as to reduce the voltage error amount; and transforming the d-axis voltage and the q-axis voltage to stationary reference frame voltages using the position of the stator flux. Another method uses both flux sensing coils and current sensors.

20 Claims, 4 Drawing Sheets

METHOD OF CONTROLLING AN INDUCTION GENERATOR

BACKGROUND OF THE INVENTION

1. Field of the Invention

The present invention relates to a method of controlling the output voltage of an induction generator.

2. Discussion of the Related Art

Many methods exist for controlling the output voltage of an induction generator operating over a very wide speed range. Most of these methods calculate internal generator variables, such as flux, from current and/or voltage measurements and thus suffer from sensitivity to a variation in the generator parameters. Other methods use shaft position sensors as part of the control loop and suffer from the resulting cost and reliability penalties.

Typically, methods of control have been developed for controlling the torque of an induction motor. For example, Direct Torque Control (DTC) has been previously used as a method of torque control for induction motors. One method of this type of torque control was developed in Japan and is described in a paper by Takahashi et al. that is entitled "A New Quick Response and High Efficiency Strategy of an Induction Motor", Conf. Record, IEEE-IAS 1985 Ann. Meeting, pp. 495–502). Another DTC was developed independently in Germany and was described in a paper by Depenbrock entitled "Direct Self Control for High Dynamic Performance of Inverter Fed AC Machines", ETZ Archiv, Vol. 7, No. 7, 1985, pp. 211–218.

The objective of these methods was to simplify the induction motor control while improving its dynamic performance. While these objectives were generally achieved, the control also gave poor steady state characteristics.

Modifications of this method were proposed by Lascu et al. in a paper entitled "A Modified Direct Torque Control (DTC) for Induction Motor Sensorless Drive", IEEE-IAS 1998 Ann. Meeting, pp. 415–422. However, even with these modifications, the control was sensitive to a change in a range of motor parameters.

DTC has been always applied to motor control but the inventors are not aware of DTC being applied to control of an induction generator. Further, sensorless schemes previously proposed for DTC were also parameter sensitive and in applications, such as automotive applications, this negates its usefulness.

SUMMARY OF THE INVENTION

The present invention seeks to provide a method of controlling an induction generator that is simpler and less expensive than previous methods.

The invention is primarily concerned with controlling an induction generator with a phase number equal to or greater than 3.

The present invention proposes to use flux sensing coils to obtain the stator flux magnitude and position rather than estimating the flux using motor equations as done in prior art. This is because using flux estimation gives results dependent on motor parameters.

One method of controlling the induction generator according to the present invention is by using DTC. DTC differs from vector control in that vector control requires current regulators, while DTC does not. In its original form, DTC only required regulation of torque and flux. In this application, the invention does not necessarily regulate torque, but rather it regulates machine flux and generator output voltage.

The present invention deals with control of induction generators and is inspired by DTC concepts, previously applied only to motor control. The features that distinguish this invention from the prior art include:

1) using DTC principles in generator control;
2) controlling the machine flux and the output voltage;
3) using flux sensing coils to obtain stator flux magnitude and position (existing DTC schemes use flux estimation which gives results dependent on motor parameters).

One application of the present invention is to an induction generator for automotive use and specifically to an induction machine automotive starter-alternator. Another application of the method of the invention is with a windmill.

The invention is also applicable to an induction machine with an electronically selectable number of poles.

One object of the present invention is to realize a minimal sensor implementation of a wide constant power speed range of a toroidally wound induction machine starter alternator (S/A), and specifically for generator mode voltage regulation.

Another object of the present invention is to use flux sensing coils to reduce the sensitivity to machine parameters and computational errors by providing a form of feedback control.

Another object of the present invention is to provide a control method that is applicable to a system where an inverter is used to control a generator where the speed is variable and is not controlled. In the case of an automotive application, the speed is dependent on the speed of the automotive engine and thus is not controlled. In the case of a windmill, the speed is dependent on the wind speed passing by the blades of the windmill that is also not controlled.

Yet another objective of this invention is to control the generator operating point and specifically the loading torque the generator exerts on the prime mover, such as an internal combustion engine or a windmill.

These and other objects of the invention can be accomplished by various methods of controlling an induction generator, as will be described. The objects of the invention can be accomplished by a method of controlling an induction generator using only flux sensing coils without requiring current sensors or position sensors. This method comprises the steps of measuring a stator flux in the generator using a plurality of flux sensing coils to determine a magnitude and position of the stator flux; measuring a DC voltage of an inverter, the inverter being operatively connected to the generator; comparing the measured stator flux magnitude with a desired flux to determine a flux error amount, the flux error amount being input to a flux regulator; determining a d-axis voltage, as the output of the flux regulator, so as to reduce the flux error amount; comparing a desired voltage with the measured DC voltage to determine a voltage error amount, the voltage error amount being input to a voltage regulator; determining a q-axis voltage, as the output of the voltage regulator, so as to reduce the voltage error amount; and transforming the d-axis voltage and the q-axis voltage to stationary reference frame voltages using the position of the stator flux.

The objects of the invention can also be accomplished by a method of controlling an induction generator using flux sensing coils and current sensors. This method comprises the steps of measuring a stator flux in the generator using a plurality of flux sensing coils to determine a magnitude and position of the stator flux; measuring a current in the generator using a plurality of current sensors; measuring a DC voltage of an inverter, the inverter being operatively connected to the generator; comparing the measured stator flux magnitude with a desired flux to determine a flux error amount, the flux error amount being input to a flux regulator; determining a desired d-axis current, as the output of the flux regulator, so as to reduce the flux error amount; comparing the desired d-axis current with the measured current to determine a d-axis current error amount, the d-axis current error amount being input to a d-axis current regulator; determining a d-axis voltage, as the output of the d-axis current regulator, so as to reduce the d-axis current error amount; comparing a desired DC voltage with the measured DC voltage to determine a voltage error amount, the voltage error amount being input to a voltage regulator; determining a q-axis voltage so as to reduce at least one of a torque error amount and a q-axis current error amount; and transforming the d-axis voltage and the q-axis voltage to stationary reference frame voltages using the position of the stator flux. Prior to determining the q-axis voltage discussed above, it is possible to determine a torque error amount and a q-axis current error amount as will be discussed below.

It is also possible to use the magnitude and position of the rotor flux instead of the magnitude and position of stator flux as rotor flux magnitude and position can be calculated from the stator flux magnitude and position.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Embodiments of the present invention are described in further detail with reference to the accompanying drawings.

The present invention deals with a control of an induction generator having a rotor and a stator that has a plurality of phase windings. The number of phases is equal to or greater than 3. A number of flux sensing coils are operatively connected to the induction generator for providing the magnitude and position of the stator flux. An inverter having a plurality of solid-state switches and a control system is also used with the induction generator. The inverter can have the same number of phases as the induction generator. The inverter is connected to selectively energize the phase windings. A programmable microprocessor, such as a digital signal processor, is operatively connected to the inverter and includes a program to implement the control of the induction generator.

In a preferred embodiment, a voltage control loop is included. In this embodiment, since the currents are not directly regulated, current measurement sensors are not required. Instead, the flux feedback is obtained from flux sensing coils, while the voltage feedback represents DC voltage of the inverter or the DC bus (battery) measured voltage.

Another benefit of using flux sensing coils is the direct flux measurement during field weakening. This can result in improved alternator performance in automotive applications, reducing the requirement for exactly modeling the machine magnetic non-linearities.

Figure 1:
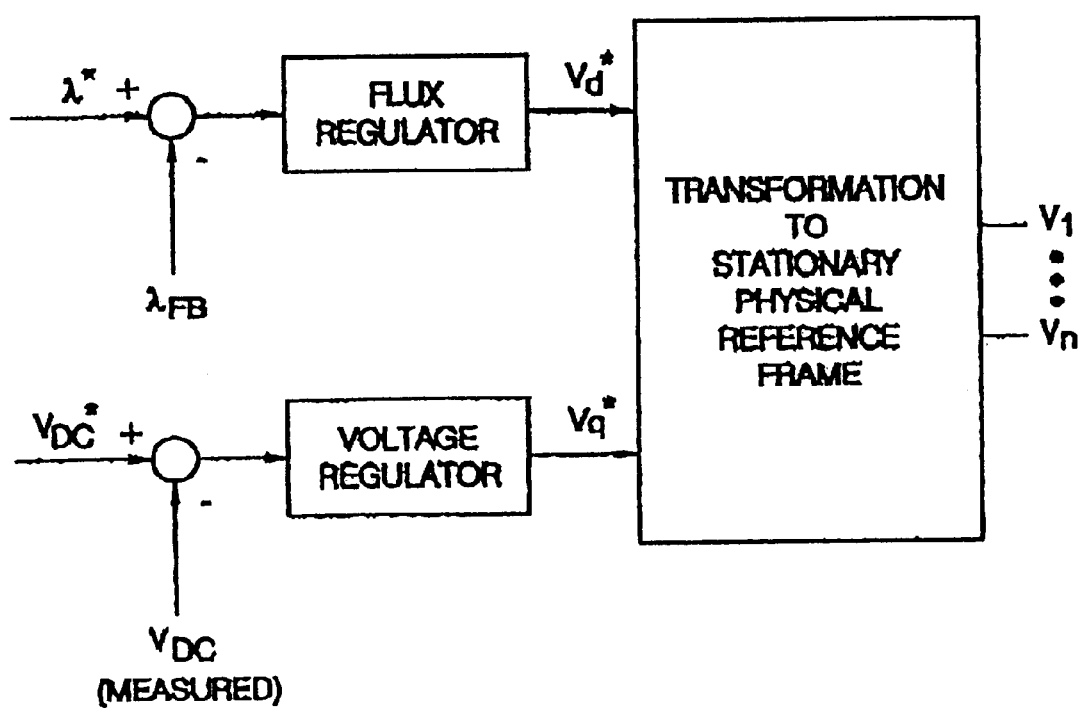
FIG. 1 is a schematic illustration of one method of determining the voltage in the d-axis and the voltage in the q-axis for an induction generator according to a first embodiment of the present invention.

According to one embodiment, the method of controlling an induction generator is shown in FIG. 1. To control the induction generator, a d-axis voltage and a q-axis voltage must be calculated and transformed into stationary reference frame voltages.

The magnitude and position of the generator stator flux, $\lambda_{FB}$ and $\theta_\lambda$, respectively, are determined using a plurality of flux sensing coils. The DC voltage $V_{DC}$ (measured) of the inverter, operatively connected to the generator, is also measured. Then the stator flux magnitude $\lambda_{FB}$ is compared with a desired flux $\lambda^*$ to determine a flux error amount $\Delta\lambda$. The d-axis voltage $V_d^*$ is then selected, as the output of the flux regulator so as to reduce the flux error amount $\Delta\lambda$.

Throughout the specification, various methods of regulation are contemplated including using a proportional integral regulator, a derivative regulator, a sample data regulator, a predictive regulator, a non-linear regulator and types of other regulators well known in the art. Also, in each regulation loop, the specific type of error (flux, voltage, torque or current) is reduced preferably to zero to achieve the desired output value that continues to be used in the control method.

FIG. 1 also illustrates the basic process to determine the q-axis voltage $V_q^*$. A desired or commanded voltage $V_{DC}^*$ is initially compared with the measured DC voltage $V_{FB}$ to determine a voltage error amount $\Delta V$. One way of obtaining the measured DC voltage $V_{FB}$ is to use the inverter measured DC input voltage. The q-axis voltage $V_q^*$ is then selected, as the output of the voltage regulator so as to reduce the voltage error amount $\Delta V$.

Once the d-axis voltage $V_d^*$ and the q-axis voltage $V_q^*$ are obtained as shown in FIG. 1, they are transformed into stationary reference frame voltages using the position of the stator flux $\theta_\lambda$ as is known in the art. The box labeled "Transformation to Stationary Physical Reference Frame" schematically illustrates this transformation. The outputs from this transformation are the respective voltages $V_1$ to $V_n$, n being the number of the generator phases. For a three-phase generator, these voltages would be $V_1$, $V_2$, and $V_3$ (also sometimes referred to as $V_a$, $V_b$, and $V_c$).

Figure 2:
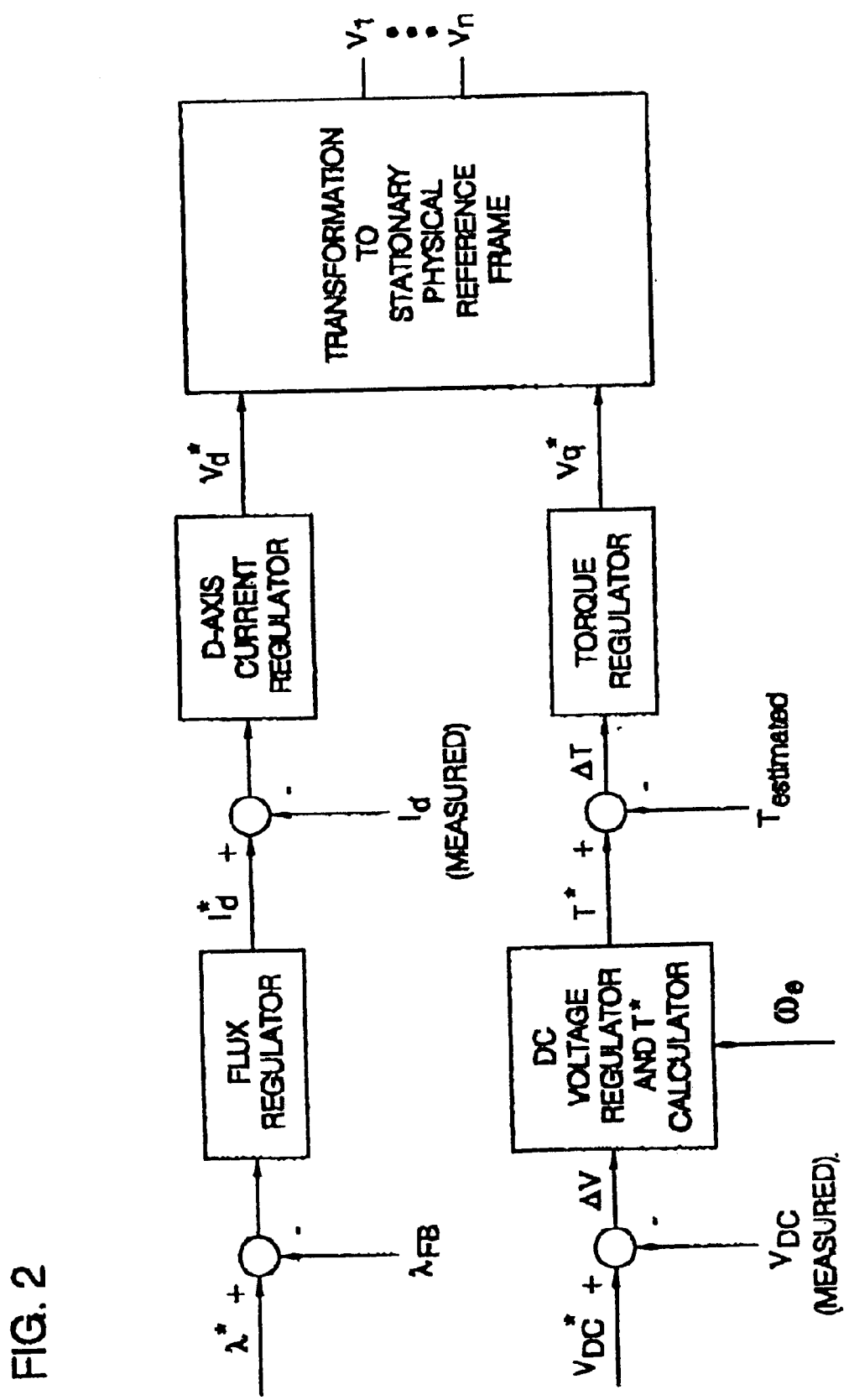
FIG. 2 is a schematic illustration of another method of determining the voltage in the d-axis and the voltage in the q-axis for an induction generator according to a second embodiment of the present invention.
Figure 3:
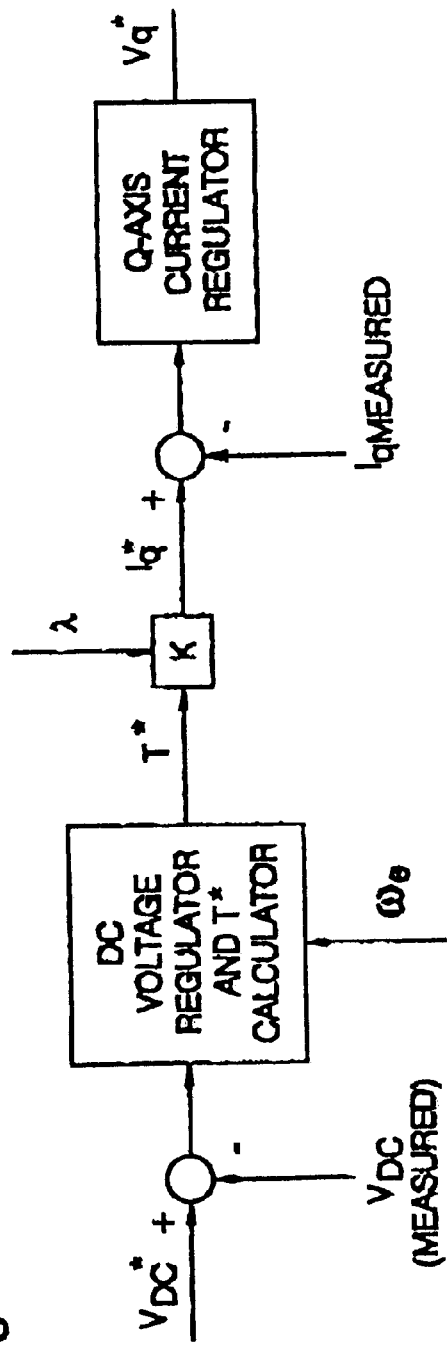
FIG. 3 is a schematic illustration of another method of determining the voltage in the q-axis for an induction generator according to a second embodiment of the present invention.
Figure 4:
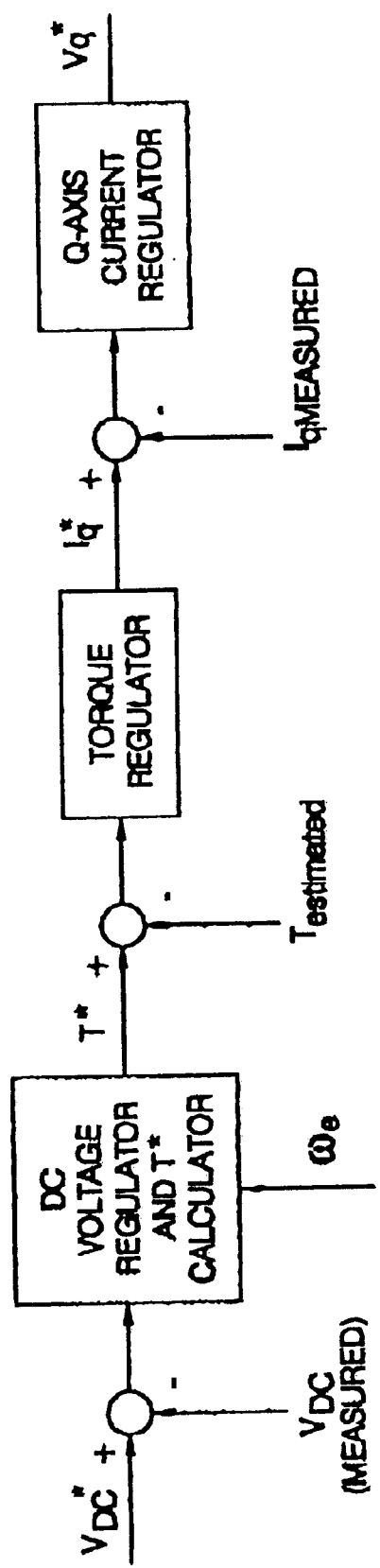
FIG. 4 is a schematic illustration of a further method of determining the voltage in the q-axis for an induction generator according to a second embodiment of the present invention.

FIGS. 2–4 show another embodiment of the present invention wherein the d-axis voltage $V_d^*$ and the q-axis voltage $V_q^*$ can be obtained if flux sensing coils and current sensors are used in combination. The addition of current sensors is not required in this invention since such sensors add significant additional expense; however, the addition of current sensors does add some protection to the system and can improve the system performance.

FIG. 2 shows a method of obtaining the d-axis voltage $V_d^*$ if current sensors were also used in combination with the flux sensing coils. As shown in FIG. 2, the magnitude and position of the generator stator flux, $\lambda_{FB}$ and $\theta_\lambda$, respectively, are determined using a plurality of flux sensing coils. Then the measured stator flux magnitude $\lambda_{FB}$ is compared with a desired flux $\lambda^*$ to determine a flux error amount $\Delta\lambda$. The d-axis current $I_d^*$ is then selected so as to reduce the flux error amount $\Delta\lambda$. The d-axis current $I_d^*$ is then compared with the measured d-axis current $I_{d\ measured}$ to determine a d-axis current error amount $\Delta I_d$. The d-axis voltage $V_d^*$ is then selected, as the output of the d-axis current regulator, so as to reduce the d-axis current error amount $\Delta I_d$.

FIGS. 2–4 show three different methods of determining the q-axis voltage $V_q^*$. These methods can be interchanged for each other. In FIG. 2, the desired DC voltage $V_{DC}^*$ is initially compared with the measured DC voltage $V_{DC}$ to determine a voltage error amount $\Delta V$. The voltage error amount $\Delta V$ is then input to a DC voltage regulator. A desired torque amount T* is then determined by dividing the output of the voltage regulator with the speed of the generator flux, $\omega_e$ so as to reduce the voltage error amount $\Delta V$. The desired torque amount T* is then compared with an estimated torque amount $T_{estimated}$ to determine the torque error amount $\Delta T$. The torque error amount $\Delta T$ is then input to a torque regulator. The q-axis voltage $V_q^*$ is then determined, as the output of the torque regulator, so as to reduce the torque error amount $\Delta T$. Once the d-axis voltage $V_d^*$ and the q-axis voltage $V_q^*$ are determined according to this method, they are transformed to stationary reference frame voltages $V_1$ to $V_n$ using the position of the stator flux as described in connection with FIG. 1.

FIG. 3 describes an alternative method of calculating the q-axis voltage $V_q^*$. In FIG. 3, the desired DC voltage $V_{DC}^*$ is initially compared with the measured DC voltage $V_{DC}$ to determine a voltage error amount $\Delta V$. The voltage error amount $\Delta V$ is then input to a DC voltage regulator. A desired torque amount T* is then determined as described previously to reduce the voltage error amount $\Delta V$. The desired torque amount T* is then used with a gain amount K to calculate the desired q-axis current amount $I_q^*$. One method of calculating the gain can include the rotor inductance $L_R$, the mutual inductance $L_m$, the rotor flux $\lambda_R$ and the number of pole pairs pp. Using these variables, the gain can be calculated by:

$$K=(2/3pp)\times(L_R/L_m)\times(1/\lambda_R)$$

It is well known in the art that other methods of calculating the gain are possible and these methods can be used in connection with this-embodiment.

After the desired q-axis current amount $I_q^*$ is determined, it is compared to the measured q-axis current $I_{q\ measured}$ to determine a q-axis current error amount $\Delta I_q$. The q-axis current error amount $\Delta I_q$ is then input to a q-axis current regulator. The q-axis voltage $V_q^*$ is then determined, as the output of the q-axis current regulator, so as to reduce the q-axis current error amount $\Delta I_q$. Once the q-axis voltage $V_q^*$ is determined according to this method, it is used in connection with the d-axis voltage $V_d^*$ determined in the upper half of FIG. 2. Both voltages are then transformed to stationary reference frame voltages $V_1$ to $V_n$ using the position of the stator flux as described above.

FIG. 4 describes another alternative method of calculating the q-axis voltage $V_q^*$ In FIG. 4, the desired DC voltage $V_{DC}$ is initially compared with the measured DC voltage $V_{DC}$ to determine a voltage error amount $\Delta V$. The voltage error amount $\Delta V$ is then input to a DC voltage regulator. A desired torque amount T* is then determined as described previously, so as to reduce the voltage error amount $\Delta V$. The desired torque amount T* is then compared with an estimated torque amount $T_{estimated}$ to determine the torque error amount $\Delta T$. The torque error amount $\Delta T$ is then input to a torque regulator.

The desired q-axis current $I_q^*$ is then determined so as to reduce the torque error amount $\Delta T$. After the desired q-axis current amount $I_q^*$ is determined, it is compared to the measured q-axis current $I_{q\ measured}$ to determine a q-axis current error amount $\Delta I_q$. The q-axis current error amount $\Delta I_q$ is then input to a q-axis current regulator. The q-axis voltage $V_q^*$ is then determined, as the output of the q-axis current regulator so as to reduce the q-axis current error amount $\Delta I_q$. Once the q-axis voltage $V_q^*$ is determined according to this method, it is used in connection with the d-axis voltage $V_d^*$ determined in the upper half of FIG. 2. Both voltages are then transformed to stationary reference frame voltages $V_1$ to $V_n$ using the position of the stator flux as described above.

The estimated torque amount $T_{estimated}$ described in FIGS. 2 and 4 can be calculated using various methods. One method of calculating the estimated torque amount $T_{estimated}$ can include the rotor inductance $L_R$, the mutual inductance $L_m$, the rotor flux $\lambda_R$ and the number of pole pairs pp. Using these variables, the estimated torque amount $T_{estimated}$ can be calculated by:

$$T_{estimated}=(3/2)\times pp\times(L_m/L_R)\times\lambda_R\times I_{q\ measured}$$

It is well known in the art that other methods of calculating the estimated torque amount are possible and these methods can be used in connection with this embodiment.

Figure 5:
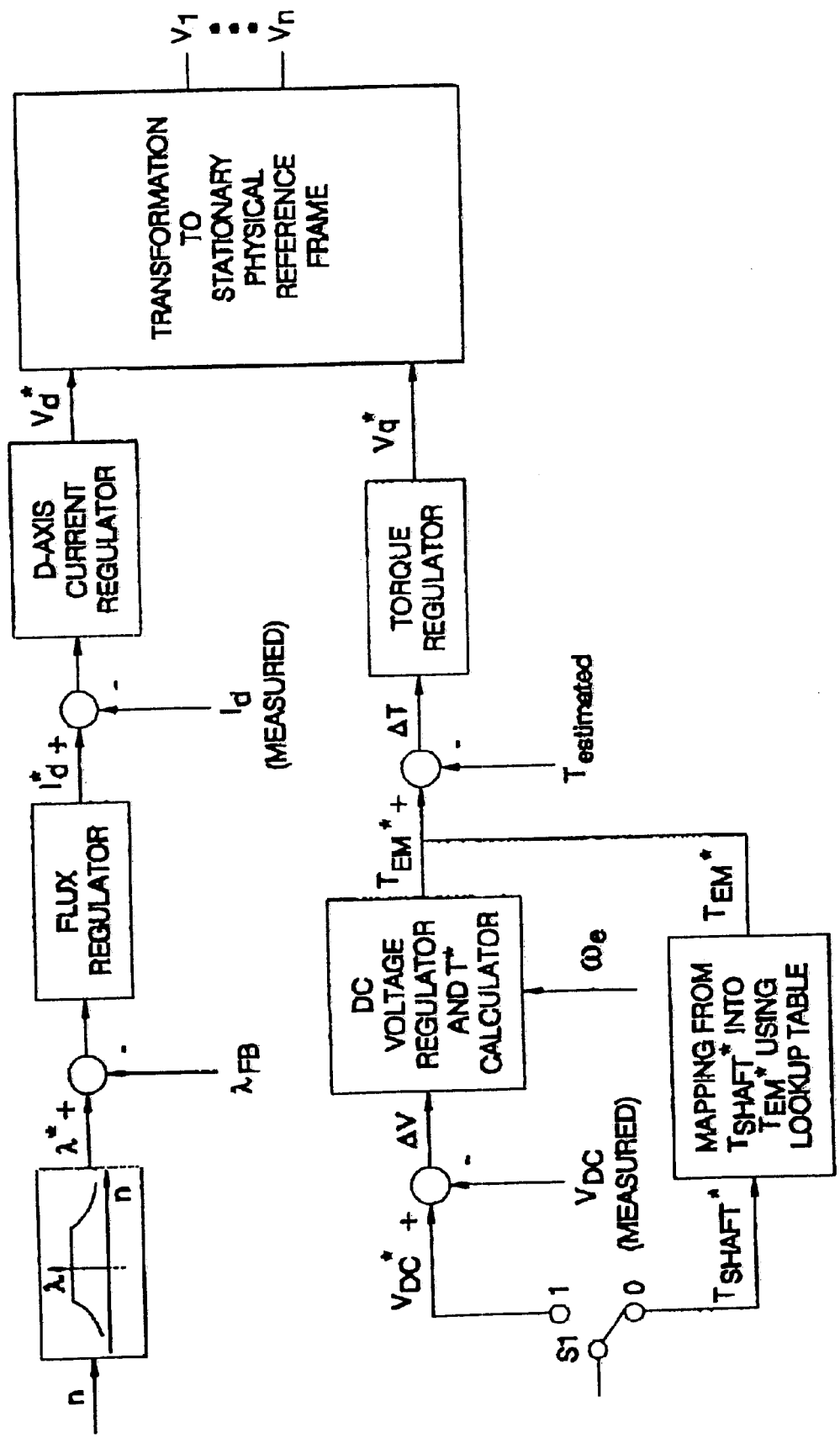
FIG. 5 is a schematic illustration of another method of determining the voltage in the d-axis and the voltage in the q-axis for an induction generator according to a third embodiment of the present invention.

FIG. 5 illustrates additional methods of determining the d-axis voltage $V_d^*$ and the q-axis voltage $V_q^*$. This is a modification of the method shown in FIG. 2 and the elements that are the same from FIG. 2 will not be described again for sake of brevity. It is also possible to include the switch and mapping function described below in determining the q-axis voltage $V_q^*$ with the methods shown and described in relation to FIGS. 3 and 4.

In the d-axis voltage line, one method of determining the desired flux $\lambda^*$ can use the speed of a crankshaft of an internal combustion engine or a windmill turbine, tied to a generator. As shown in FIG. 5, the speed n is mapped into the desired flux, based on a speed-flux curve. It is also possible to use other speed measurements, for example, the speed of the generator shaft. This generates the desired flux $\lambda^*$ that is then compared with the measured flux $\lambda_{FB}$. The remaining steps of calculating the desired d-axis voltage are described above in connection with FIG. 2.

Regarding the q-axis voltage line, it is possible to include a switch S1 (hardware or software switch) that can be selected to guide the flow of the control method depending on a desired mode of operation. When the switch S1 is in position 1, the q-axis voltage line operates in a manner as described in connection with FIG. 2 above. When the switch S1 is in position 0, the default position, the control system bypasses the voltage comparison and the DC voltage regulator steps. Instead, the method uses the generator desired shaft torque $T_{SHAFT}$ and calculates the desired electromagnetic torque $T_{EM}^*$ through an interpolation mapping function that includes compensating for the torque losses in the generator. Other methods of calculating the desired electromagnetic torque $T_{EM}^*$ from the desired generator shaft torque, well known in the art, are also possible. The desired electromagnetic torque $T_{EM}^*$ is then compared with the estimated torque and the method continues as described above in connection with FIG. 2.

This allows a choice of voltage regulation or torque regulation at the systems level, especially for a case of an integrated starter generator.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A method of controlling an induction generator, said method comprising the steps of:
   measuring a stator flux in the generator using a plurality of flux sensing coils to determine a magnitude and position of the stator flux;
   measuring a DC voltage of an inverter, the inverter being operatively connected to the generator;
   comparing the measured stator flux magnitude with a desired flux to determine a flux error amount, the flux error amount being input to a flux regulator;
   determining a d-axis voltage so as to reduce the flux error amount;
   comparing a desired voltage with the measured DC voltage to determine a voltage error amount, the voltage error amount being input to a voltage regulator;
   determining a q-axis voltage so as to reduce the voltage error amount; and
   transforming the d-axis voltage and the q-axis voltage to stationary reference frame voltages using the position of the stator flux.

2. A method as defined in claim 1, wherein said method includes at least one of reducing the flux error amount to zero in said step of determining a d-axis voltage and reducing the voltage error amount to zero in said step of determining a q-axis voltage.

3. A method as defined in claim 1, wherein said step of measuring a DC voltage comprises measuring a DC battery voltage.

4. A method as defined in claim 1, wherein said method includes controlling a toroidally wound generator.

5. A method as defined in claim 1, wherein said step of regulating a d-axis voltage and regulating a q-axis voltage include using a proportional integral regulator.

6. A method of controlling an induction generator, said method comprising the steps of:
   measuring a stator flux in the generator using a plurality of flux sensing coils to determine a magnitude and position of the stator flux;
   calculating a magnitude and position of a rotor flux from the stator flux;
   measuring a DC voltage of an inverter, the inverter being operatively connected to the generator;
   comparing at least one of the measured stator flux magnitude and the calculated rotor flux magnitude with a desired flux to determine a flux error amount, the flux error amount being input to a flux regulator;
   determining a d-axis voltage so as to reduce the flux error amount;
   comparing a desired voltage with the measured DC voltage to determine a voltage error amount;
   determining a q-axis voltage so as to reduce the voltage error amount, the voltage error amount being input to a voltage regulator; and
   transforming the d-axis voltage and the q-axis voltage to stationary reference frame voltages using at least one of the position of the stator flux and the position of the rotor flux.

7. A method as defined in claim 6, wherein said method includes at least one of reducing the flux error amount to zero in said step of determining a d-axis voltage and reducing the voltage error amount to zero in said step of determining a q-axis voltage.

8. A method as defined in claim 6, wherein said step of measuring a DC voltage comprises measuring a DC battery voltage.

9. A method as defined in claim 6, wherein said method includes controlling a toroidally wound generator.

10. A method as defined in claim 6, wherein said step of regulating a d-axis voltage and regulating a q-axis voltage include using a proportional integral regulator.

11. A method of controlling an induction generator, said method comprising the steps of:
    measuring a stator flux in the generator using a plurality of flux sensing coils to determine a magnitude and position of the stator flux;
    measuring a current in the generator using a plurality of current sensors;
    measuring a DC voltage of an inverter, the inverter being operatively connected to the generator;
    comparing the measured stator flux magnitude with a desired flux to determine a flux error amount, the flux error amount being input to a flux regulator;
    determining a desired d-axis current so as to reduce the flux error amount;
    comparing the desired d-axis current with the measured current to determine a d-axis current error amount, the d-axis current error amount being input to a d-axis current regulator;
    determining a d-axis voltage so as to reduce the d-axis current error amount;
    comparing a desired DC voltage with the measured DC voltage to determine a voltage error amount, the voltage error amount being input to a voltage regulator;
    determining a q-axis voltage so as to reduce at least one of a torque error amount and a q-axis current error amount; and
    transforming the d-axis voltage and the q-axis voltage to stationary reference frame voltages using the position of the stator flux.

12. A method as defined in claim 11, further comprising the steps of:
    determining a desired torque amount so as to reduce the voltage error amount;
    comparing the desired torque amount with an estimated torque amount to determine the torque error amount, the torque error amount being input to a torque regulator; and
    wherein said step of determining the q-axis voltage reduces the torque error amount.

13. A method as defined in claim 12, further comprising the steps of:
    determining the desired torque amount by switching between said steps of 1) comparing a desired DC voltage with the measured DC voltage to determine a voltage error amount and determining a desired torque amount, as an output of the voltage regulator, so as to reduce the voltage error amount; and 2) determining the desired torque amount by obtaining a desired generator shaft torque amount and converting the generator shaft torque amount to the desired torque amount by a mapping function.

14. A method as defined in claim 11, further comprising the steps of:

determining a desired torque amount, as an output of the voltage regulator, so as to reduce the voltage error amount;

calculating a desired q-axis current amount from the desired torque amount;

comparing the desired q-axis current amount with a measured q-axis current amount to determine a q-axis current error amount, the q-axis current error amount being input to a q-axis current regulator; and wherein said step of determining the q-axis voltage reduces the q-axis current error amount.

15. A method as defined in claim 14, further comprising the steps of:

determining the desired torque amount by switching between said steps of 1) comparing a desired DC voltage with the measured DC voltage to determine a voltage error amount and determining a desired torque amount, as the output of the voltage regulator, so as to reduce the voltage error amount; and 2) determining the desired torque amount by obtaining a desired generator shaft torque amount and converting the generator shaft torque amount to the desired torque amount by a mapping function.

16. A method as defined in claim 11, further comprising the steps of:

determining a desired torque amount so as to reduce the voltage error amount;

comparing the desired torque amount with an estimated torque amount to determine the torque error amount, the torque error amount being input to a torque regulator;

determining a desired q-axis current amount to reduce the torque error amount;

comparing the desired q-axis current amount with a measured q-axis current amount to determine the q-axis current error amount, the q-axis current amount being input to a q-axis current regulator; and wherein said step of determining the q-axis voltage reduces the q-axis current error amount.

17. A method as defined in claim 16, further comprising the steps of:

determining the desired torque amount by switching between said steps of 1) comparing a desired DC voltage with the measured DC voltage to determine a voltage error amount and determining a desired torque amount, as an output of the voltage regulator, so as to reduce the voltage error amount; and 2) determining the desired torque amount by obtaining a desired generator shaft torque amount and converting the generator shaft torque amount to the desired torque amount by a mapping function.

18. A method of controlling an induction generator, said method comprising the steps of:

measuring a stator flux in the generator using a plurality of flux sensing coils to determine a magnitude and position of the stator flux;

calculating a magnitude and position of a rotor flux from the stator flux;

measuring a current in the generator using a plurality of current sensors;

measuring a DC voltage of an inverter, the inverter being operatively connected to the generator;

comparing at least one of the measured stator flux magnitude and the calculated rotor flux magnitude with a desired flux to determine a flux error amount, the flux error amount being input to a flux regulator;

determining a desired d-axis current so as to reduce the flux error amount;

comparing the desired d-axis current with the measured current to determine a d-axis current error amount, the d-axis current error amount being input to a d-axis current regulator;

determining a d-axis voltage so as to reduce the d-axis current error amount;

comparing a desired DC voltage with the measured DC voltage to determine a voltage error amount, the voltage error amount being input to a voltage regulator;

determining a q-axis voltage so as to reduce at least one of a torque error amount and a q-axis current error amount; and transforming the d-axis voltage and the q-axis voltage to stationary reference frame voltages using at least one of the position of the stator flux and the position of the rotor flux.

19. A method of controlling an induction generator, said method comprising the steps of:

measuring a stator flux in the generator using a plurality of flux sensing coils to determine a magnitude and position of the stator flux;

measuring a current in the generator using a plurality of current sensors;

measuring a DC voltage of an inverter, the inverter being operatively connected to the generator;

comparing the measured stator flux magnitude with a desired flux to determine a flux error amount, the flux error amount being input to a flux regulator;

determining a desired d-axis voltage so as to reduce the flux error amount;

comparing a desired DC voltage with the measured DC voltage to determine a voltage error amount, the voltage error amount being input to a voltage regulator;

determining a q-axis voltage so as to reduce at least one of a torque error amount and a q-axis current error amount; and transforming the d-axis voltage and the q-axis voltage to stationary reference frame voltages using the position of the stator flux.

20. A method as defined in claim 16, further comprising the steps of:

determining a desired torque amount by switching between the steps of 1) comparing a desired DC voltage with the measured DC voltage to determine a voltage error amount and determining a desired torque amount, as an output of the voltage regulator, so as to reduce the voltage error amount; and 2) determining the desired torque amount by obtaining a desired generator shaft torque amount and converting the generator shaft torque amount to the desired torque amount by a mapping function.

* * * * *